United States Patent
Takeuchi (10) Patent No.: US 9,718,202 B2
(45) Date of Patent: Aug. 1, 2017

(54) METHOD AND APPARATUS FOR MEASURING PROTRUSION LENGTH OF PROTRUSION PORTION

(71) Applicant: BRIDGESTONE CORPORATION, Tokyo (JP)

(72) Inventor: Hisashi Takeuchi, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 134 days.

(21) Appl. No.: 14/787,083

(22) PCT Filed: Apr. 18, 2014

(86) PCT No.: PCT/JP2014/061035
§ 371 (c)(1),
(2) Date: Oct. 26, 2015

(87) PCT Pub. No.: WO2014/175175
PCT Pub. Date: Oct. 30, 2014

(65) Prior Publication Data
US 2016/0089806 A1    Mar. 31, 2016

(30) Foreign Application Priority Data

Apr. 25, 2013  (JP) ................................. 2013-092414

(51) Int. Cl.
*G01B 11/02*    (2006.01)
*B26D 5/34*    (2006.01)
(Continued)

(52) U.S. Cl.
CPC .............. *B26D 5/34* (2013.01); *B26D 3/00* (2013.01); *B26D 3/003* (2013.01); *B26D 5/02* (2013.01); *B29D 30/46* (2013.01); *G01B 11/043* (2013.01)

(58) Field of Classification Search
CPC ............. B26D 5/34; G01B 7/02; G01B 11/02
(Continued)

(56) References Cited

U.S. PATENT DOCUMENTS 3,719,114 A * 3/1973 Vischulis .............. B23D 31/04
                                                     83/170
4,173,912 A * 11/1979 Holp ..................... B26D 1/035
                                                     83/368
4,549,453 A    10/1985 Yazaki et al.

FOREIGN PATENT DOCUMENTS

JP    S59-123647 A    7/1984
JP    H07-195571 A    8/1995
(Continued)

OTHER PUBLICATIONS

Jun. 12, 2016 Office Action issued in Chinese Patent Application No. 201480023676.0.

(Continued)

*Primary Examiner* — G. Bradley Bennett
(74) *Attorney, Agent, or Firm* — Oliff PLC (57) ABSTRACT

Method and apparatus for measuring a protrusion length of a protrusion portion on each side of sheet after cutting even when there is variation in positions of cords embedded in the sheet, apparatus with imaging unit that images cross-sectional profile in width direction of sheet including protrusion portions, and generates waveform data from imaging of cross-sectional profile, detect maximum height-positions of crests and of troughs of waveform data, set, based on waveform data, a maximum height-position of crest closest to width end of sheet as maximum height-position of end crest, set a position corresponding to an edge of protrusion portion of sheet, located on more width end side than maximum height-position of end crest, as minimum height-position of a terminal trough, detect distance in width direction of sheet between maximum height-position of end crest and of the terminal trough, and measure protrusion length of protrusion portion based on detected distance.

8 Claims, 5 Drawing Sheets

(51) Int. Cl.
*B29D 30/46* (2006.01)
*B26D 3/00* (2006.01)
*B26D 5/02* (2006.01)
*G01B 11/04* (2006.01)

(58) Field of Classification Search
USPC .......................................... 33/732, 733, 834
See application file for complete search history.

(56) References Cited

FOREIGN PATENT DOCUMENTS

| | | |
|---|---|---|
| JP | H08-156132 A | 6/1996 |
| JP | 2006-349627 A | 12/2006 |
| JP | 2009-172691 A | 8/2009 |
| JP | 2012-106332 A | 6/2012 |
| JP | 2013-049109 A | 3/2013 |

OTHER PUBLICATIONS

Jul. 22, 2014 International Search Report issued in International Patent Application No. PCT/JP2014/061035.
Jul. 15, 2014 Office Action issued in Japanese Patent Application No. 2013-092414.
Jul. 22, 2014 Written Opinion issued in International Patent Application No. PCT/JP2014/061035.
Apr. 7, 2016 Extended Search Report issued in European Patent Application 14787482.0.

\* cited by examiner

METHOD AND APPARATUS FOR MEASURING PROTRUSION LENGTH OF PROTRUSION PORTION

TECHNICAL FIELD

The present invention relates to the measurement of a protrusion length of a protrusion portion and, in particular, to a method and apparatus for measuring the protrusion length of the protrusion portion of a sheet with cords embedded therein.

BACKGROUND ART

Conventionally, rubber sheets used as carcasses and belts of tires have a plurality of cords extending in their length direction embedded therein. These rubber sheets are fabricated by covering both surfaces of the cords with rubber extruded from calender rolls while a plurality of parallelly arranged cords are being conveyed. In the process of covering the cord surfaces with rubber, excess pieces are formed on both width end sides of the rubber sheet. Thus protrusion rubber as the protrusion portion of the sheet is formed by cutting off the excess pieces at appropriate positions.

As a method of forming protrusion rubbers which are the protrusion portions, a rubber sheet cutting apparatus as described in Patent Document 1 has been proposed.

With the above-mentioned apparatus, however, since it actually measures the width of the rubber sheet with its width sensor and estimates the width of protrusion rubber based on the measured width of the rubber sheet, there may be cases where there occurs variation in positions of cords embedded in the rubber sheet without any change in the width of the rubber sheet during fabrication. And this can cause deviations in the positions of the embedded cords along the width direction of the rubber sheet. In such cases, protrusion rubbers of a predetermined length cannot be formed by cutting off the excess pieces with accurate dimensions, and furthermore the body part of the rubber sheet where cords are embedded can be cut into accidentally.

CONVENTIONAL ART DOCUMENT

Patent Document

Patent Document 1: Japanese Unexamined Patent Application Publication No. 2009-172691

SUMMARY OF THE INVENTION

Problems to be Solved by the Invention

To solve the above-described problems, the invention provides a method and apparatus capable of accurately detecting, even when there is variation in positions of cords embedded in a sheet, the positions where the codes are embedded and measuring protrusion lengths of protrusion portions on both sides of the sheet after cutting.

Means for Solving the Problem

To solve the above-described problems, the method for measuring protrusion lengths of protrusion portions according to the present invention is a method for measuring a protrusion length of a protrusion portion formed at least on one side of a long rubber sheet with a plurality of parallelly arranged cords embedded therein. The method includes generating waveform data by imaging a cross-sectional profile by an imaging means in a width direction of the sheet including the protrusion portion, detecting maximum height positions of crests and minimum height positions of troughs of the waveform data, setting, based on the waveform data, a maximum height position of a crest closest to a width end of the sheet as a maximum height position of an end crest, setting a position corresponding to an edge of the protrusion portion of the sheet, which is located on more width end side than the maximum height position of the end crest, as a minimum height position of a terminal trough, detecting a distance in the width direction of the sheet between the maximum height position of the end crest and the minimum height position of the terminal trough, and measuring the protrusion length of the protrusion portion based on the detected distance.

It is to be understood that the foregoing summary of the invention does not necessarily recite all the features essential to the invention, and subcombinations of all these features are intended to be included in the invention.

Hereinafter, the invention will be described based on preferred embodiments which do not intend to limit the scope of the claims of the present invention but exemplify the invention. All of the combinations of the features described in the embodiments are not necessarily essential to the solving means of the invention. The embodiments should be understood to include selectively adopted configurations.

MODE FOR CARRYING OUT THE INVENTION

Figure 1:
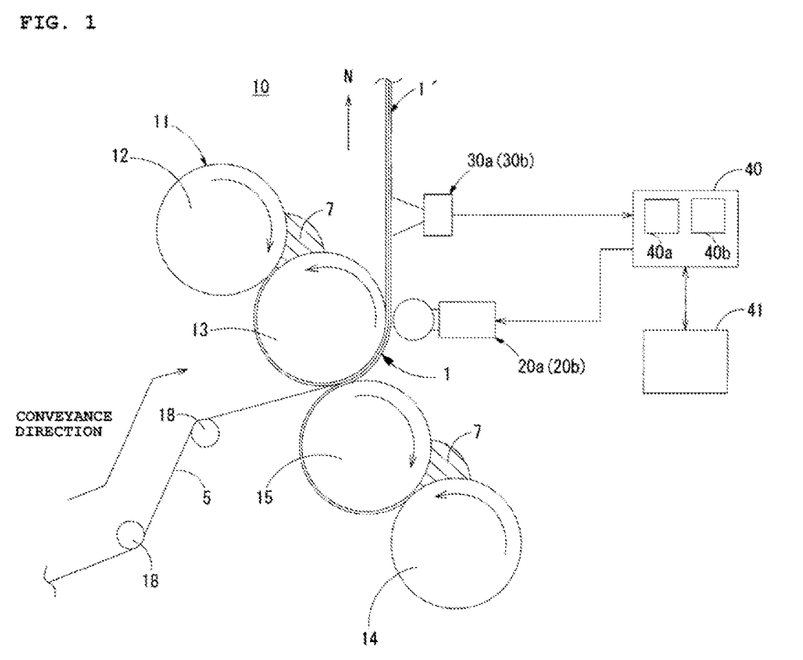
FIG. 1 is a schematic illustration of a sheet forming apparatus.
Figure 2:
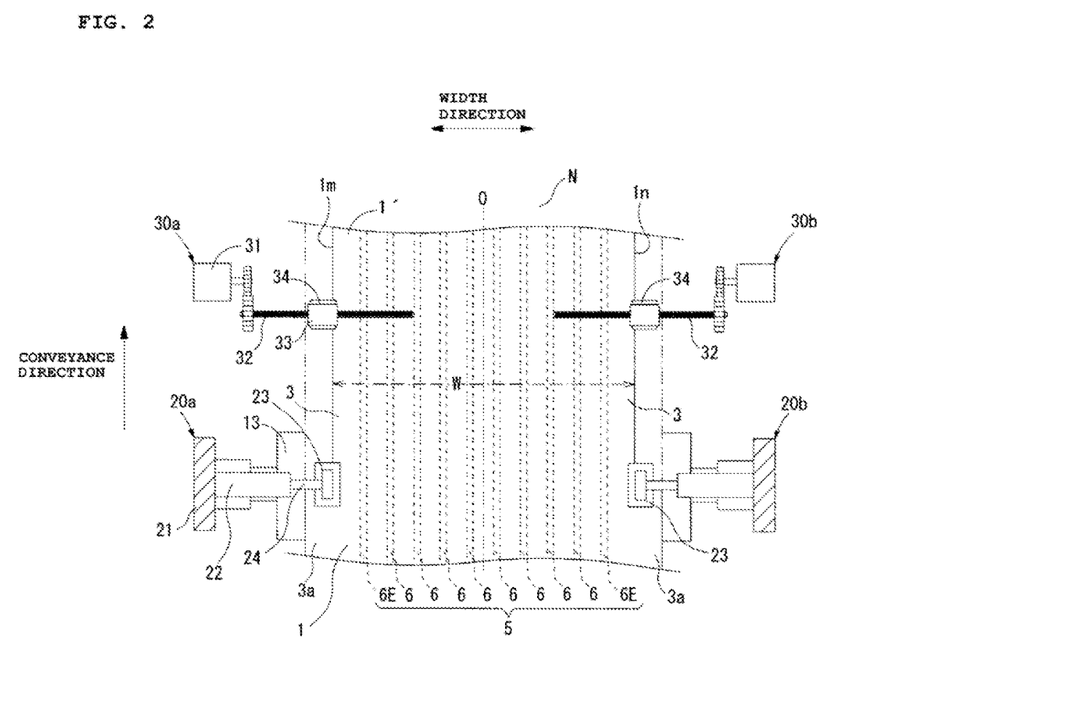
FIG. 2 is an elevation view of a rubber sheet and the sheet forming apparatus.

FIG. 1 and FIG. 2 are schematic illustrations of a sheet forming apparatus 10 including an apparatus for measuring protrusion lengths of protrusion portions according to the present invention.

The sheet forming apparatus 10 shown in FIG. 1 and FIG. 2 forms a rubber sheet 1 with a cord array 5 embedded therein by integrally covering surfaces of the cord array 5 being conveyed along a conveyance route with rubber material 7. The sheet forming apparatus 10 further forms a rubber sheet 1' as a final product having protrusion rubbers 3 by cutting off excess pieces 3a formed on both width ends of the rubber sheet 1.

Figure 3:
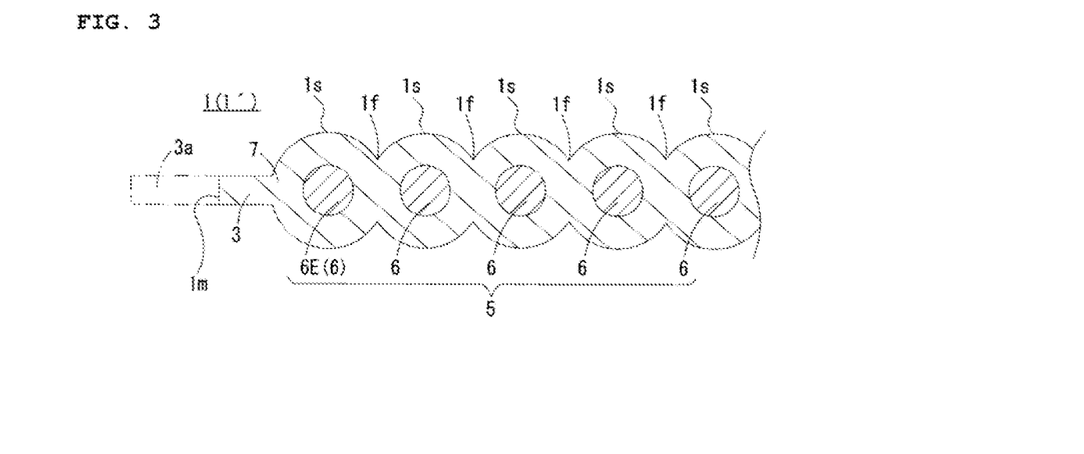
FIG. 3 is a cross-sectional view showing a part of the rubber sheet.

The rubber sheet 1, as shown in FIG. 3, is a member used in the carcass or the belt structure of a tire, for instance. The rubber sheet 1 is formed of a cord array 5, which is a plurality of long cords 6 parallelly arranged at predetermined intervals, and rubber material 7 covering the front and back surfaces of the cord array 5 and integrated with the code array 5. Note that, of the cord array 5 according to the present embodiment, a cord 6 located in the outermost position in the width direction of the rubber sheet 1 is specifically referred to as an end cord 6E.

The rubber sheet 1 is a long member in an extension direction of the cord 6. The surface of the rubber sheet 1 is so shaped that a position where a cord 6 is embedded is convexed according to the shape of the cord 6 and a position between adjacent cords 6 where a cord 6 is not embedded is concaved. That is, the surface shape has raised portions 1s and recessed portions 1f to be discussed later. Also, flat protrusion rubbers 3 protrude from both width ends of the rubber sheet 1. The protrusion rubbers 3 are formed into a predetermined protrusion length by cutting off excess pieces 3a which are formed on each width end of the rubber sheet 1 when the rubber sheet 1 is formed. That is, there are excess pieces 3a protruding in the width direction from both edges of the rubber sheet 1 immediately after its fabrication, and the protrusion rubbers 3 are formed by cutting off the excess pieces 3a into a predetermined length along the length direction of the rubber sheet 1.

As shown in FIG. 1 and FIG. 2, the sheet forming apparatus 10 includes roughly a calender 11 consisting of a plurality of calender rolls 12 to 15 disposed along a conveyance route, cutter units 20a, 20b as cutting means for forming protrusion rubbers 3 of a rubber sheet 1 formed by the calender 11, sensor units 30a, 30b disposed downstream of the cutter units 20a, 20b as imaging means for measuring the cross-sectional profile of the rubber sheet 1, and a control unit 40 as control means for controlling the cutter units 20a, 20b according to measurement signals outputted by the sensor units 30a, 30b. The control unit 40 includes an image processing means 40a and an analysis means 40b.

The calender 11 is equipped with the first to fourth calender rolls 12 to 15 disposed, for instance, in an S-shaped arrangement. The calender rolls 12 to 15, which are each a metallic cylindrical member of the same diameter, for instance, is rotatable at the same speed in opposite directions from each other driven by a motor not shown in the figures.

The first calender roll 12 is, for example, rotatable at a predetermined speed in the forward direction. The second calender roll 13 is disposed opposite to the first calender roll 12 with a predetermined gap therebetween. The second calender roll 13 is disposed in parallel with the first calender roll 12 and is rotatable at a predetermined speed in the reverse direction, which is the reverse of the forward rotation of the first calender roll 12.

Rubber material 7 is fed from a not-shown rubber extruder or the like into the gap between the first calender roll 12 and the second calender roll 13. The rubber material 7 covers a surface of a cord array 5 having a plurality of cords 6 arranged therein as the calendar rolls 12 to 15 rotate.

The fourth calender roll 15 is disposed opposite to the second calender roll 13 with a predetermined gap therebetween. The fourth calender roll 15 is disposed in parallel with the second calender roll 13 and is rotatable at a predetermined speed in the forward direction in the same way as the first calender roll 12. Also, the cord array 5 to be covered with the rubber material 7 is conveyed from upstream to downstream in the conveyance direction between the second calender roll 13 and the fourth calender roll 15. The third calender roll 14 is disposed opposite to the fourth calender roll 15 with a predetermined gap therebetween. The third calender roll 14 is disposed in parallel with the fourth calender roll 15 and is rotatable at a predetermined speed in the reverse direction in the same way as the second calender roll 13.

Rubber material 7, with which the other surface of the cord array 5 is covered, is fed from a not-shown rubber extruder or the like into the gap between the third calender roll 14 and the fourth calender roll 15 in the same way as described above.

As shown in FIG. 2, the cutter units 20a, 20b are disposed downstream of the calender 11 along the conveyance route. The cutter units 20a, 20b, located on the respective width end sides of the rubber sheet 1, form protrusion rubbers 3 by cutting off excess pieces 3a formed on the rubber sheet 1. The cutter units 20a, 20b are each roughly comprised of a frame 21 for securing a cylinder 22, the cylinder 22 having a piston 24 therein and movable along the width direction of the rubber sheet 1, and a cutter 23 fixed to the piston 24 for forming the protrusion rubber 3 of the rubber sheet 1.

The cylinder 22, which is, for instance, a hydraulic cylinder operable hydraulically, is disposed in parallel with the width direction of the rubber sheet 1. The cylinder 22 can increase or decrease the projection length of the piston 24 by increasing or decreasing the hydraulic pressure inside, thus moving the piston 24 in the width direction of the rubber sheet 1. The cutter 23, which is movable along the width direction of the rubber sheet 1 together with the movement of the piston 24, can cut off the excess piece 3a of the rubber sheet 1 as it comes in contact with the rubber sheet 1 being conveyed continuously. It is to be noted that the cutter 23 can move closer to and away from the rubber sheet 1. The cutter 23 moves closer to the rubber sheet 1 when it cuts off the excess piece 3a and stays away from the rubber sheet 1 when it does not form the protrusion rubber 3 by cutting off the excess piece 3a.

Although the details will be discussed later, the sheet forming apparatus 10 is equipped with cutters 23 as cutting means to cut the protrusion rubbers 3 according to the protrusion lengths of the protrusion rubbers 3. Accordingly, the protrusion rubbers 3 can be cut according to the protrusion lengths.

The sensor units 30a, 30b as imaging means are disposed downstream of the cutter units 20a, 20b. The sensor units 30a, 30b, located on the respective width end sides of the rubber sheet 1 in correspondence to the cutter units 20a, 20b, measure and detect the cross-sectional profile of the rubber sheet 1. The sensor units 30a, 30b are each roughly comprised of a drive motor 31 having a rotating shaft, a shaft 32 having a rotating shaft linked with the rotating shaft of the drive motor 31, a moving member 33 movable by the rotation of the drive motor 31, and a sensor 34 attached to the moving member 33.

The drive motor 31, which is, for instance, a servo motor, transmits rotative force to the shaft 32 as it runs. The shaft 32 is a shaft member extending along the width direction of the rubber sheet 1 and has male thread formed on the surface thereof. The moving member 33, having a ball screw structure, is movable along the axis direction of the shaft 32. Accordingly, the moving member 33 can be moved in the axis direction of the shaft 32, driven by the drive motor 31. Thus the sensor 34 attached to the moving member 33 can be moved along the width direction of the rubber sheet 1.

The sensor 34 is, for instance, a laser sensor or a line image sensor. The sensor 34 measures the cross-sectional profile of the edge region of the rubber sheet 1 from the width center side to the width end side thereof, namely, the surface shape of the rubber sheet 1 at the time of measurement. To be more specific, when a laser sensor is used, for instance, the sensor 34 can measure the surface shape of the rubber sheet 1 where it is irradiated with a laser by casting a laser beam to the surface of the rubber sheet 1 and detecting the reflected light. Also, the sensor 34 measures the cross-sectional profile of the rubber sheet 1 being continuously conveyed, for example, intermittently at intervals of 20 milliseconds. It is to be noted, however, that the measurement of the rubber sheet 1 is not limited to one at the intervals of 20 milliseconds, but may be changed according to the conveyance speed or the detection accuracy of the sensor.

Figure 4:
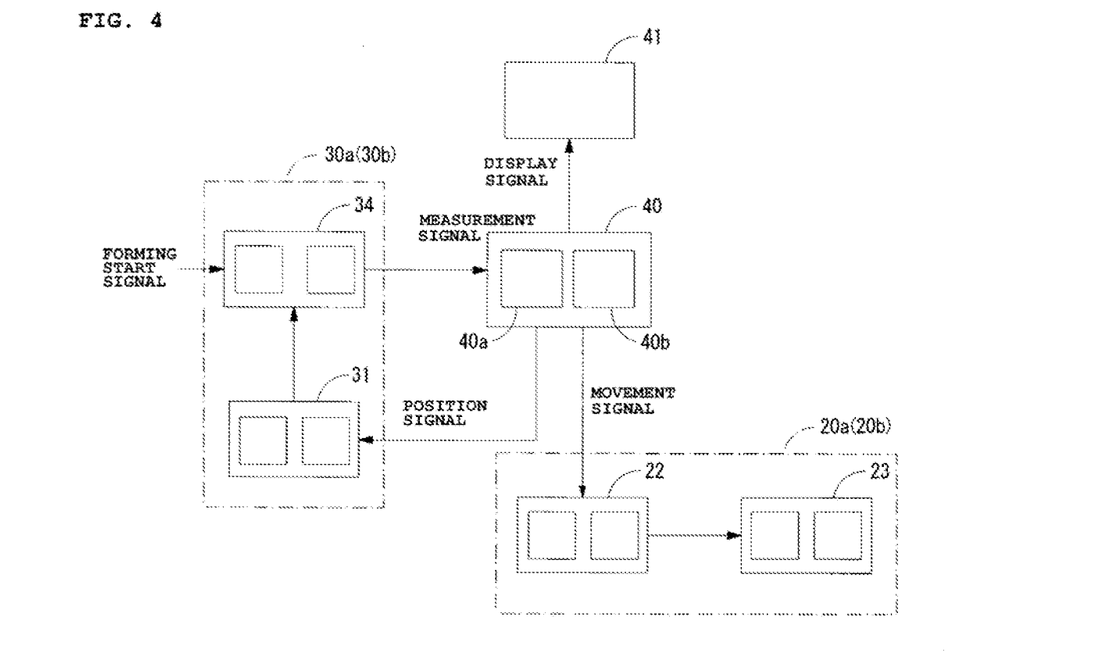
FIG. 4 is a block diagram showing electrical connections of the sheet forming apparatus.

As shown in FIG. 4, the sensors 34 of the sensor units 30*a*, 30*b* operate based on a forming start signal from a forming start switch as an input means. The sensors 34 each measure the cross-sectional profile of the protrusion portion of the rubber sheet 1 with the input of a forming start signal and output the result of the measurement as a measurement signal to the control unit 40.

The control unit 40 is in a word a computer. The control unit 40 is equipped with a CPU as computing means, a ROM, RAM, and HDD as storage means, and I/O interface as communication means. The control unit 40 computes the positions of the end cords 6E and the protrusion lengths of the protrusion rubbers 3 of the rubber sheet 1 by operating according to the measurement signals from the sensors 34.

Also, the control unit 40 outputs movement signals to the cylinders 22 according to the computed protrusion lengths of the protrusion rubbers 3. The cylinders 22, according to the movement signals from the control unit 40, change the projection length of the pistons 24 by adjusting the hydraulic pressure supplied to the cylinders 22 and thereby move the cutters 23 attached to the pistons 24 along the width direction of the rubber sheet 1.

Also, the control unit 40 outputs position signals indicating the positions of the protrusion rubbers 3 after the cutting by the cutters 23 to the drive motors 31 simultaneously with the output of the movement signals to the cylinders 22. The drive motor 31 checks the current position of the drive motor 31 against the positions of the protrusion rubbers 3 indicated by the position signals from the control unit 40 and thus determines whether there is any dislocation of the drive motor 31 from the edge of the rubber sheet 1.

Also, the control unit 40 outputs a display signal for displaying the computed protrusion lengths of the protrusion rubbers 3 on the monitor 41. The monitor 41 displays the protrusion lengths of the protrusion rubbers 3 upon the input of the display signal.

In this manner, the sheet forming apparatus 10 uses sensor units 30*a*, 30*b* as imaging means to detect the cross-sectional profile of the surface of the rubber sheet 1. As a result, the cord array 5 and end cords 6E embedded in the rubber sheet 1 can be identified with accuracy and speed, and the edge positions and protrusion lengths of the protrusion rubbers 3 can be computed accurately from the identified positions of the end cords 6E.

Hereinafter, a description is given of the operation of forming the rubber sheet 1 and detecting the protrusion rubber 3 by the sheet forming apparatus 10. As shown in FIG. 1, the sheet forming apparatus 10 conveys the cord array 5 which runs from a not-shown unwinding drum to a not-shown winding drum.

The sheet forming apparatus 10 guides the cord array 5 unwound from the unwinding drum by a plurality of guide rollers 18, 18 and conveys the cord array 5 in its length direction to the calender 11 disposed on the conveyance route.

The calender 11 of the sheet forming apparatus 10 covers the cord array 5 with rubber material 7 by the rotation of the first to fourth calender rolls 12 to 15. More specifically, the second calender roll 13 and the fourth calender roll 15 cover the surfaces of the cord array 5 passing between the second calender roll 13 and the fourth calender roll 15 with the rubber material 7, thereby forming a rubber sheet 1. Upon completion of the forming of the rubber sheet 1, the calender 11 discharges the rubber sheet 1 formed with excess pieces 3*a* from a not shown discharge outlet.

Next, the sheet forming apparatus 10 conveys the rubber sheet 1 discharged from the calender 11 to the cutter units 20*a*, 20*b* disposed downstream of the calender 11. The cutters 23 each attached to the piston 24 move in the width direction of the rubber sheet 1 in answer to the movement signals outputted from the control unit 40 to the cylinders 22. And the cutters 23 form the protrusion rubbers 3 by continuously cutting off the excess pieces 3*a* of the rubber sheet 1 being continuously conveyed from upstream to downstream.

Next, the sheet forming apparatus 10 conveys the rubber sheet 1' having the protrusion rubbers 3 formed by the cutters 23 to the sensor units 30*a*, 30*b* as imaging means disposed downstream of the cutter units 20*a*, 20*b* as cutting means. The sensors 34 measure the cross-sectional profile of both the edge regions of the rubber sheet 1 intermittently at intervals of 20 milliseconds as rubber sheet 1 is continuously conveyed. More specifically, the surface shape of the rubber sheet 1 at the time of laser irradiation is measured by casting a laser beam to the width end region of the rubber sheet 1 being conveyed downstream along the conveyance route and receiving the reflected light. And, upon completion of each time of measurement, the sensors 34 each outputs a measurement signal to the control unit 40.

Upon the input of the measurement signal from the sensor 34, the control unit 40 executes the processing to detect the end cord 6E and thereby detects the position of the end cord 6E. The details of this processing will be discussed later. Also, the control unit 40 computes the protrusion length of the protrusion rubber 3 after the cutting by the cutter 23 from the detected position of the end cord 6E. The control unit 40 outputs the computed protrusion length of the protrusion rubber 3 to the piston 24 and the monitor 41. In other words, when the protrusion length of the post-cutting protrusion rubber 3 exceeds a reference value, the control unit 40 outputs a signal to the piston 24 to move in the direction to decrease the protrusion length of the protrusion rubber 3. Conversely, when the protrusion length of the post-cutting protrusion rubber 3 does not reach the reference value, the control unit 40 outputs a signal to the piston 24 to move in the direction to increase the protrusion length of the protrusion rubber 3.

In this manner, according to the present invention, the cross-sectional profile of the rubber sheet 1 is imaged, and therefore the end cords 6E can be detected reliably. And the protrusion length of the protrusion rubbers 3 can be computed based on this detection. Thus the computation of the protrusion length of the protrusion rubbers 3 can be done with accuracy unlike the conventional method which measures the thickness of the rubber sheet 1. More specifically, the sensors 34 of the sensor units 30*a*, 30*b* measure the protrusion lengths of the protrusion rubbers 3 formed after the cutting off of the excess pieces 3*a* of the rubber sheet 1 and feed back the amount of excess or deficiency relative to a predetermined reference value to the cylinders 22 that control the movement of the cutters 23. Therefore, the protrusion length of the post-cutting protrusion rubbers 3 can be always maintained constant relative to the reference value and hence the productivity or quality of the rubber sheet 1' can be improved.

Also, the end cords 6E are detected by imaging the cross-sectional profile of the rubber sheet 1. Accordingly, even when the end cords 6E are of a non-magnetic material, the end cord 6E and the protrusion length of the protrusion rubber 3 can be computed with great accuracy.

The sheet forming apparatus 10 further conveys the rubber sheet 1 downstream after the measurement by the sensors 34. And the sheet forming apparatus 10 keeps conveying the rubber sheet 1 by guiding it with not-shown guide rollers and completes the forming of the rubber sheet 1 by finally winding it around a not-shown winding drum.

Now a description is given of the principles of the method and apparatus for measuring the protrusion length of protrusion rubber 3 with reference to the accompanying figures.

As shown in FIG. 2, in the process of conveying a rubber sheet 1 with cords 6 embedded therein, the cutter units 20a, 20b as cutting means cut off excess pieces 3a, 3b on the left and right ends of rubber sheet 1 at predetermined positions. As a result, the protrusion rubbers 3, 3 as protrusion portions shorter than the excess pieces 3a, 3b are formed on the left and right edges as shown in FIG. 3. In this manner, a sheet of a predetermined width W including the protrusion rubbers 3, 3 is formed. It is to be noted that the width W of the rubber sheet 1 can be freely adjusted by moving the cutter units 20a, 20b evenly in the approaching or separating direction according to the size of the finished tire.

Figure 5:
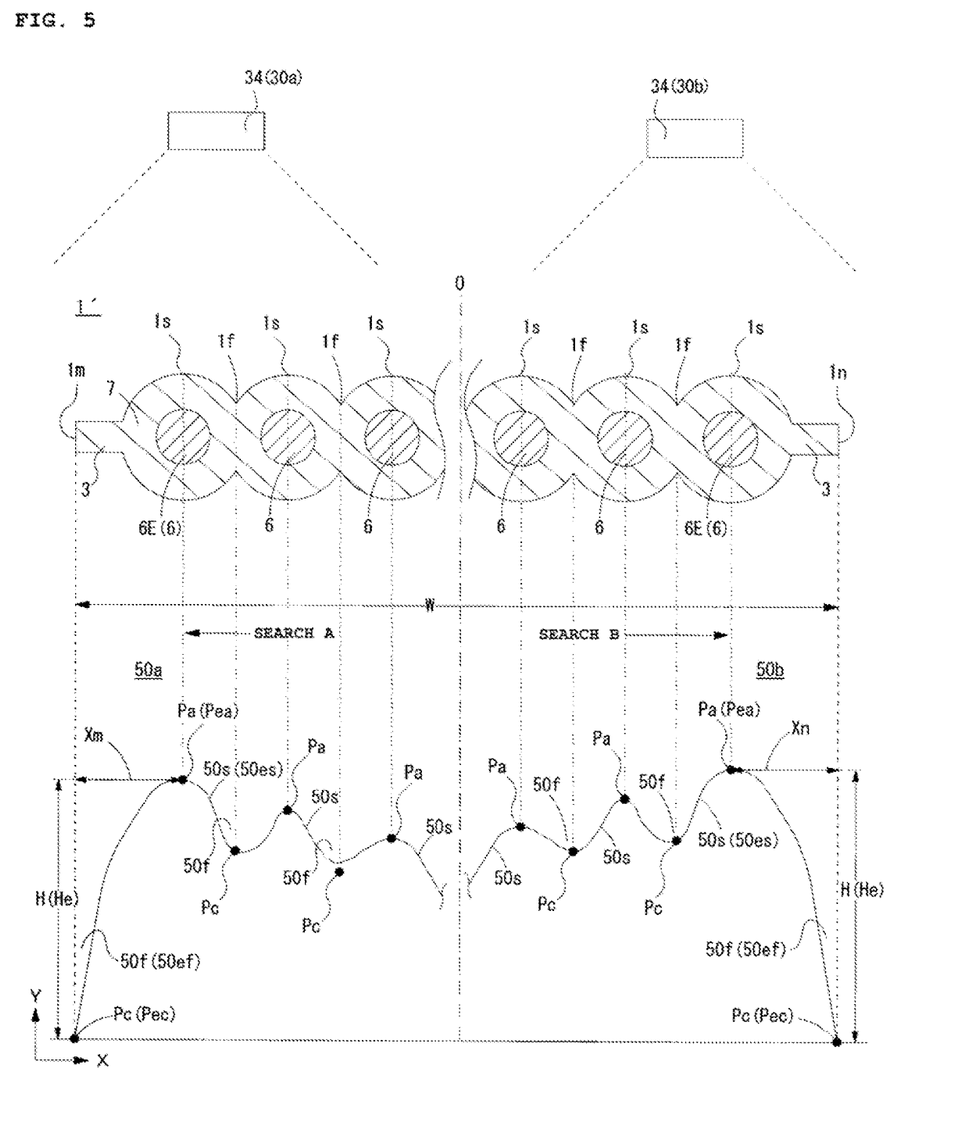
FIG. 5 is a diagram showing a relationship between the rubber sheet and waveform data.

As shown in FIG. 5, on the downstream side of the cutter 23, the sensor unit 30a as an imaging means disposed on one edge side of the rubber sheet 1 images a range from the shown left edge 1m side of the protrusion rubber 3 to the center O side by receiving the reflected light of laser. Also, the sensor unit 30b disposed on the other edge side of the rubber sheet 1 images a range from the shown right edge 1n side of the protrusion rubber 3 to the center O side by receiving the reflected light of laser. And waveforms 50a, 50b as waveform data are generated on the X and Y coordinates by a processing executed by the image processing means 40a of the control unit 40 based on the results of imaging by the sensor units 30a, 30b. Note that the waveforms 50a, 50b in FIG. 5 are the data shown on the coordinates with the X axis representing the width direction of the rubber sheet 1 and the Y axis representing the height direction thereof. These waveforms 50a, 50b are displayed on the monitor 41. Then the waveforms 50a, 50b are subjected to the following analysis by the analysis means 40b of the control unit 40 as control means.

On the left edge 1m side (waveform 50a side), a search for data of waveform 50a is made from the center O side to the left edge 1m side as indicated by the search A arrow in FIG. 5. Through this search, the maximum height positions Pa of the crests 50s and the minimum height positions Pc of the troughs 50f are detected alternately.

It is to be noted here that "crest 50s" as used herein means vicinities of the region where the height is maximum of the waveform data in the width cross section of the rubber sheet 1, and "maximum height position Pa" a point where the height of a crest 50s is maximum. Also, "trough 50f" means vicinities of the region where the height is minimum of the waveforms 50a, 50b in the width cross section of the rubber sheet 1, and "minimum height position Pc" a point where the height of a trough 50f is minimum.

Of the maximum height positions Pa, the maximum height position Pea of the end crest 50es is the maximum height position of the crest 50s located on the left edge 1m side (protrusion rubber 3 side). The maximum height position Pea of the end crest 50es is identified by the method to be discussed later. The maximum height position Pea of the end crest 50es thus identified corresponds to the end cord located on the left edge 1m side, that is, the center position of the end cord 6E, and thus the position of the end cord 6E can be ascertained.

Also, of the minimum height positions Pc, the minimum height position Pec of the terminal trough 50ef is the lowest end of the trough 50f located on the left edge 1m side. The distance Xm in the width direction (X-axis direction) of the rubber sheet 1 from the maximum height position Pea of the end crest 50es to the minimum height position Pec of the terminal trough 50ef stands for the length (protrusion length) of the protrusion rubber 3, or the length from the center of the end cord 6E to the left edge 1m (end) of the protrusion rubber 3. In this manner, the length (protrusion length) of the protrusion rubber 3 can be ascertained.

On the right edge 1n side (waveform 50b side), a search for data of waveform 50b is made from the center O side to the right edge 1n side of the rubber sheet 1 as indicated by the search B arrow in FIG. 5. Through this search, the maximum height positions Pa of the crests 50s and the minimum height positions Pc of the troughs 50f are detected alternately.

The maximum height position Pea of the end crest 50es is the maximum height position of the crest 50s located on the right edge 1n side (protrusion rubber 3 side), which is identified by one of the methods to be discussed later. The maximum height position Pea of the end crest 50es thus identified corresponds to the end cord located on the right edge 1n side, that is, the center position of the end cord 6E, and thus the position of the end cord 6E can be ascertained.

Also, of the minimum height positions Pc, the minimum height position Pec of the terminal trough 50ef is the lowest end of the trough 50f located on the right edge 1n side. The distance Xn in the width direction (X-axis direction) of the rubber sheet 1 from the maximum height position Pea of the end crest 50es to the minimum height position Pec of the terminal trough 50ef stands for the length (protrusion length) of the protrusion rubber 3, or the length from the center of the end cord 6E to the right edge 1n (end) of the protrusion rubber 3. In this manner, the length (protrusion length) of the protrusion rubber 3 can be ascertained.

Figure 7A:
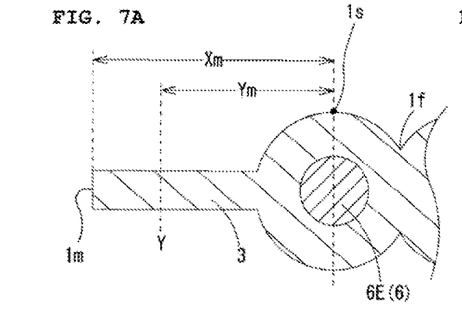
FIGS. 7A and 7B are schematic depictions of enlarged ends of the rubber sheet.
Figure 7B:
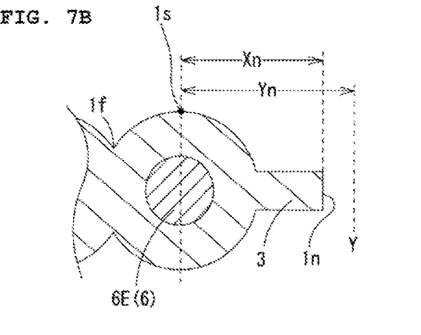
Figure 8A:
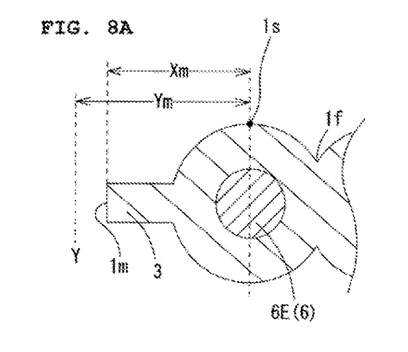
FIGS. 8A and 8B are schematic depictions of enlarged ends of a rubber sheet.
Figure 8B:
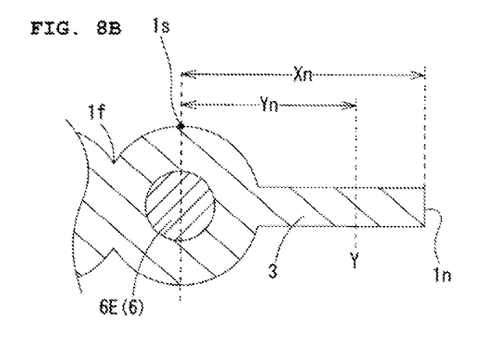

In connection with the cutter units 20a, 20b constituting the cutting means, as shown in FIG. 7 and FIG. 8, the control unit 40 constituting the control means adjusts the lengths of the protrusion rubbers 3 by the following operation, according to the protrusion lengths relative to the reference position Y of the protrusion rubbers 3 on the left edge 1m side and the right edge 1n side of the rubber sheet 1. That is, the following adjustment will be made so that the left edge 1m and the right edge 1n, which are the respective edges of the protrusion rubbers 3, may coincide with the reference position Y.

It is to be noted that the reference position Y is a reference point a predetermined distance (Ym, Yn) apart in the X-axis direction from the maximum height positions Pea of the end crests 50es. The reference position Y is predetermined to set the length of the protrusion rubbers 3 as designed.

When the left edge 1m (cut plane) of the protrusion rubber 3 protrudes from the reference position Y, with the distance Xm exceeding the reference position Y, on the left edge 1m side as shown in FIG. 7A, the protrusion rubber 3 on the right edge 1n side contrariwise becomes shorter with the edge thereof being located inside of the reference position Y as shown in FIG. 7B.

In cases like this, control is made such that the cutter units 20a, 20b as the cutting means are moved rightward (in the illustration) relative to the linear flow of the rubber sheet 1 or otherwise the flow of the rubber sheet 1 itself is moved leftward (in the illustration).

When the protrusion rubber 3 on the left edge 1m side is shorter than the reference position Y as shown in FIG. 8A, the protrusion rubber 3 on the right edge 1n side is longer than the reference position Y on the right edge 1n side as shown in FIG. 8B. In such a case, the cutter units 20a, 20b or the conveyance of the rubber sheet 1 is adjusted in the direction opposite to the above.

It is to be noted that the reference position Y is given a certain allowance so that no hunting results from the adjustment of the cutter units 20a, 20b or the flow of the rubber sheet 1.

Also, in the present embodiment, the sensor units 30a, 30b are disposed on the respective sides of the protrusion rubbers 3, 3. However, there is a fixed relationship between the length (protrusion length) of the protrusion rubber 3 on the left edge 1m side and the length (protrusion length) thereof on the right edge 1n side during operation, that is, when one of them is long, the other is short. Therefore, only one of the sensor units 30a, 30b may be disposed on its side of the rubber sheet 1 to get a desired length for the protrusion rubbers 3, 3.

Also, a single unit of imaging means, if it is a wide angle imaging type, can cover the whole rubber sheet 1 in the width direction thereof. This arrangement can particularly be applied to the rubber sheet 1 of relatively narrow width for small tire applications.

Also, there may be cases where the protrusion length of the protrusion rubber 3 is in excess of a reference value or a reference value with a certain degree of tolerance. For such cases, the arrangement may be such that a not-shown alarm means lights up or sounds an alarm in addition to the feedback control. This makes it possible to carry out an adjustment of the abnormal place efficiently.

Also, in the process of arraying the cords 6, there may be cases where deviation of the end cord 6E inward or outward in the left-right direction causes variation in the protrusion length of the protrusion rubber 3. In anticipation of such cases, the arrangement may be such that the control unit 40 constantly checks to see whether the position in the X-axis direction of the maximum height position Pea of the end crest of the end cord 6E relative to the maximum height position Pa of the neighboring cord 6 is within an acceptable range. In this manner, a processing can be carried out to correct or adjust the apparatus for conveying the cords 6 downstream.

Also, the arrangement may be such that the reference position Y can be set at different positions on the left edge 1m side and the right edge 1n side. By doing so, it is possible to use different lengths for the left and right protrusion rubbers 3, 3 according to the type of product to which the rubber sheet 1 is applied.

Figure 6:
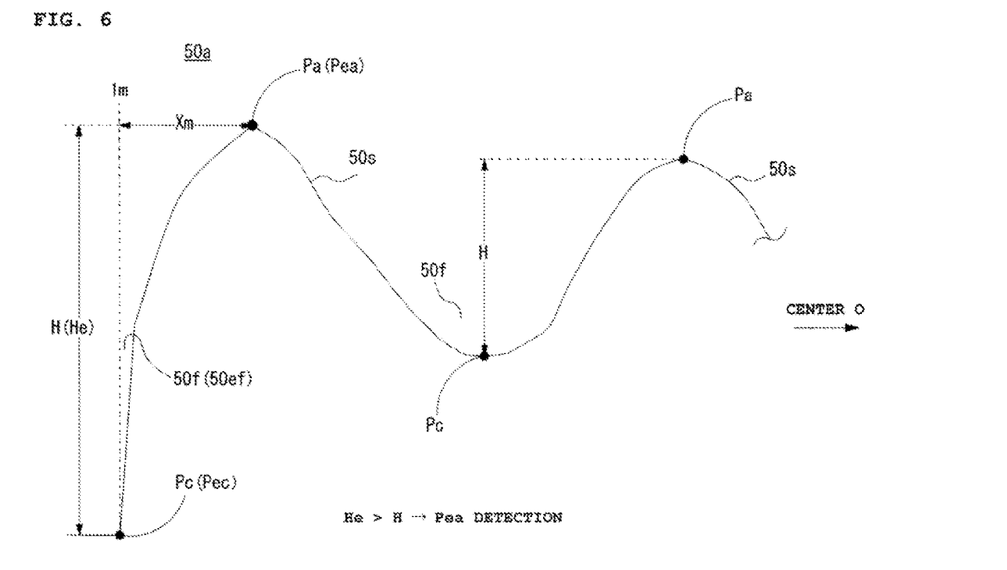
FIG. 6 is a schematic depiction of an enlarged part of the waveform data.

Now a description is given of methods for identifying the maximum height position Pea of the end crest 50es with reference to FIG. 6.

In a first method, for the waveform 50a, a successive detection is made of the distance H in the height direction (direction perpendicular to the rubber sheet 1, namely, the Y-axis direction) between the maximum height position Pa of each crest 50s and the minimum height position Pc of the trough 50f on the left edge 1m side of the crest 50s forward in the search A direction. Through this process, it is determined whether or not the distance H of a crest 50s of the derived waveform 50a is longer than the distance H on the backward side of the crest 50s in the search A direction (backward in the search A direction, namely, the center O side). Since the terminal trough 50ef has the distance He longer by a predefined distance than the distance H in the backward direction, it is possible to identify that the terminal trough 50ef is the maximum height position Pea of the end crest 50es.

In other words, the maximum height position Pea of the end crest 50es is identified on condition that the distance He in the height direction between the maximum height position Pea of the end crest 50es and the minimum height position Pec of the terminal trough 50ef is longer by a predefined distance than the distance H in the height direction between the maximum height position Pa of the crest 50s in the backward direction from the end crest 50es and the minimum height position Pc of the trough 50f.

Thus, the maximum height position Pea of the end crest 50es is identified by confirming that the distance He in the height direction between the maximum height position Pea of the end crest 50es and the minimum height position Pec of the terminal trough 50ef is longer than the distance H in the height direction between the maximum height position Pa of the crest 50s located on the center side of the rubber sheet 1 and the minimum height position Pc of the trough 50f. Accordingly, the maximum height position Pea of the end crest 50es, namely, the end cord 6E can be identified by a simple method of measuring the distance He in the height direction between the maximum height position Pea of the end crest 50es and the minimum height position Pec of the terminal trough 50ef. This makes the control by the control unit 40 as control means easier.

In a second method, for the waveform 50a, a successive detection is made of the distance H in the height direction between the maximum height position Pa of each crest 50s and the minimum height position Pc of the trough 50f on the left edge 1m side (forward in the search direction) of the crest 50s. Then the distances H thus obtained are compared with a predetermined value (for example, an average value of the distances H calculated in advance through experiment or an appropriate value determined optionally). Then, as a result of this comparison, the maximum height position Pea of the end crest 50es is identified by detecting the largest value of distance H relative to the predetermined value, which is the distance He in this example.

In other words, the maximum height position Pea of the end crest 50es is identified on condition that the distance He in the height direction between the maximum height position Pea of the end crest 50es and the minimum height position Pec of the terminal trough 50ef is larger than the predetermined value.

Thus, the maximum height position Pea of the end crest 50es is identified by confirming that the distance He in the height direction between the maximum height position Pea of the end crest 50es and the minimum height position Pec of the terminal trough 50ef is larger than the predetermined value. This requires only a comparison of the distances H between the maximum height positions Pa of the crests 50s and the troughs 50f with a predetermined value, thus making the control by the control unit 40 as control means easier.

In a third method, for the waveform 50a, the maximum height positions Pa from the center O (or from the maximum height position Pa of an optional crest 50s on the center O side) are counted sequentially on the assumption that the intervals between the cords 6 are all constant. And the maximum height position Pea of the end crest 50es is identified on condition that the count is equal to a predetermined value. This is on condition that the count value of the maximum height position Pea of the end crest 50es is already fixed if the intervals between the cords 6 are constant.

In other words, the maximum height position Pea of the end crest 50es is detected when the count from the center O side of the rubber sheet 1 has reached a predetermined value.

Thus, the number of crests 50s of the waveforms 50a, 50b is counted from the center O side toward the edge of the rubber sheet 1, and the maximum height position Pea of the end crest 50es is when the number of crests 50s has reached a predetermined value. To realize this counting, a counter function may be given to the control unit 40 as control means, or a counter may be provided separately. In this manner, the maximum height position Pea of the end crest 50es can be detected easily.

In a fourth method, for the waveform 50a, the distance from the center O side (or from the maximum height position Pa of a predefined crest 50s on the center O side) to a maximum height position Pa forward in the search A direction is detected, thus identifying the maximum height position Pea of the end crest 50es. This works, as with the foregoing method, because the distance from the center O side or from a specific maximum height position Pa to the maximum height position Pea of the end crest 50es is already fixed if the intervals of the cords 6 are constant.

That is, the maximum height position Pea of the end crest 50es is identified when the distance from a prescribed position near the center O of the rubber sheet 1 to the maximum height position Pa of a crest 50s on the width end side of the rubber sheet 1 is in excess of a predetermined value.

Thus the maximum height position Pea of the end crest 50es is assumed to be at a predetermined distance from an optional position on the center O side of the rubber sheet 1 in the width direction of the rubber sheet 1. Accordingly, the maximum height position Pea of the end crest 50es can be detected when the crest 50s is at the predefined distance. And this makes the identification of the maximum height position Pea of the end crest 50es easy.

In a fifth method, the maximum height positions Pa of the crests 50s are compared with a predetermined comparison level in the Y-axis direction. And the crest 50s having the longest distance in the height direction from the comparison level are identified as the maximum height positions Pea of the end crests 50es. This works because the maximum height position Pea of the end crest 50es is higher than the comparison level when a warpage in the width direction of the rubber sheet 1 occurs such that the crests 50s on the left edge 1m side and the right edge 1n side are gradually higher than the crests 50s on the center O side. The warpage like this is considered to occur immediately after the fabrication of the rubber sheet 1 when the top surface thereof dries earlier and contracts.

In other words, of a plurality of maximum height positions Pa, the maximum height positions Pa which are determined to be the highest from the comparison level are identified as the maximum height positions Pea of the end crests 50es.

Thus, when the maximum height position Pea of the end crest 50es is determined to be the highest from the predefined level of the end crest 50es, the identification of the maximum height position Pea of the end crest 50es becomes easy.

Also, in another method, an analysis is made individually of the maximum height positions Pa of the crests 50s to find that the distance H in the height direction from the minimum height position Pc of the trough 50f forward in the search A or search B direction is greater by a predetermined distance than the distance H in the height direction from the minimum height position Pc of the trough 50f on the backward side thereof. In this way, it is possible to identify the maximum height positions Pea of the end crests 50es.

In regard to the maximum height positions Pea of the end crests 50es, the distance He in the height direction at the minimum height position Pec of the terminal trough 50ef at the forefront is greater by a predefined distance than the distances H in the height direction from the minimum height positions Pc of the troughs 50f on the backward side. Accordingly, the maximum height positions Pea of the end crests 50es can be identified.

In still another method, a search is made to find whether there is any maximum height position Pa present on the forward side of a crest 50s in the search A or search B direction. And the maximum height position Pea of the end crest 50es can be identified by confirming that there is no more maximum height position Pa on the forward side.

That is, absence of the maximum height position Pa forward in the search A or the search B direction means the absence of a crest 50s on the forward side. Therefore, the maximum height positions Pea of the end crests 50es can be identified.

Figure 9:
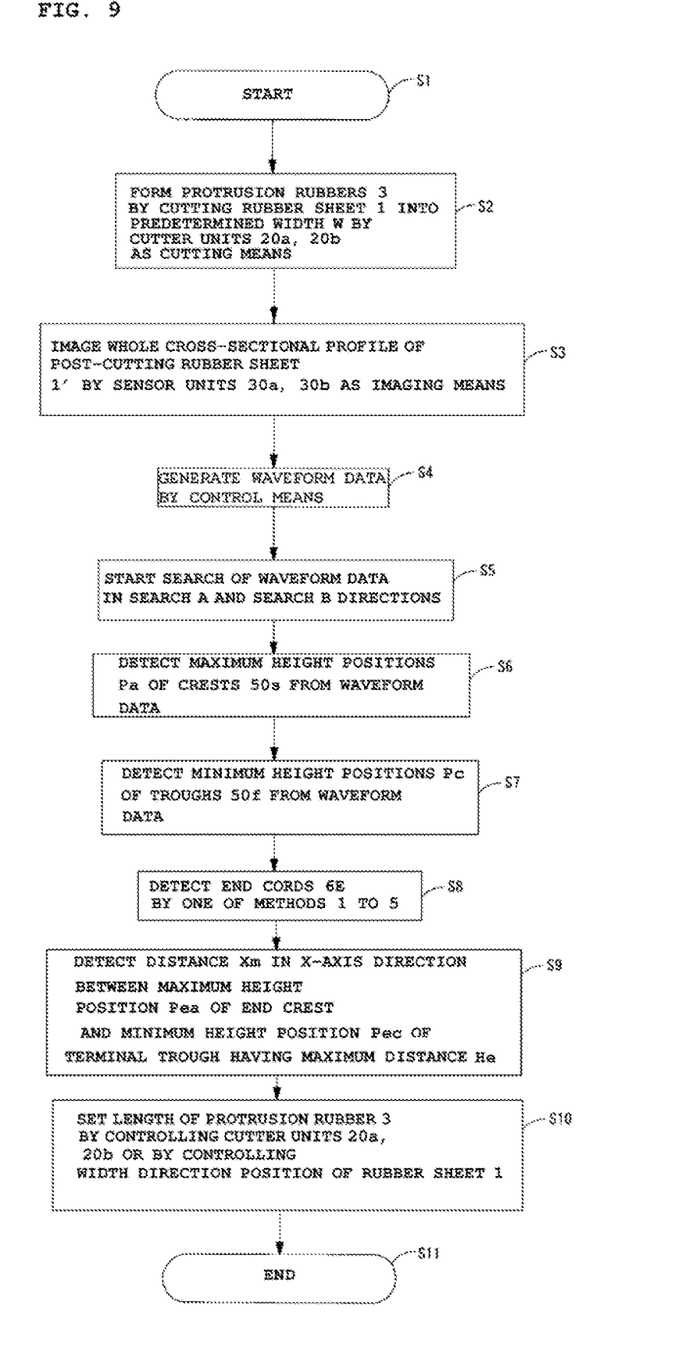
FIG. 9 is a flowchart showing a flow of detection of protrusion lengths of protrusion portions.

Now a description is given of a method for measuring the protrusion length of the protrusion rubbers 3, 3 according to the present embodiment with reference to the flowchart of FIG. 9.

In step S1, the procedural flow is started. In step S2, protrusion rubbers 3, 3 are formed by cutting a rubber sheet 1 into a predetermined width W with cutter units 20a, 20b as cutting means.

In step S3, a whole cross-sectional profile of the rubber sheet 1 including the post-cutting protrusion rubbers 3, 3 is imaged by sensor units 30a, 30b. In step S4, waveforms 50a, 50b are generated as waveform data by a control unit 40 as control means. In step S5, an analysis search of the waveforms 50a, 50b is started in the search A and search B directions.

Next, in step S6, the maximum height positions Pa of crests 50s are detected from the waveforms 50a, 50b. In step S7, the minimum height positions Pc of troughs 50f are detected from the waveforms 50a, 50b. In step S8, end cords 6E are detected by one of the various methods described. In step S9, the distance Xm in the X-axis direction between the maximum height position Pea of the end crest 50es having the maximum distance He and the minimum height position Pec of the terminal trough is detected. The distance Xm is the protrusion length of the protrusion rubber. Next, in step S10, the protrusion rubbers 3, 3 are set for the predetermined length by controlling the cutter units 20a, 20b or the position of the rubber sheet 1 in the width direction by the control unit 40. In step S11, the procedural flow is ended.

As described above, the waveforms 50a, 50b having the crests 50s corresponding to the raised portions 1s of the rubber sheet 1 and the troughs 50f corresponding to the recessed portions 1f of the rubber sheet 1 are generated by imaging the cross-sectional profile of the rubber sheet 1. And from the waveforms 50a, 50b, the maximum height positions Pea of the end crests 50es corresponding to the end cords 6E are detected. Therefore, the positions of the end cords 6E can be detected accurately.

Also, a detection is made of the maximum height position Pea of the end crest 50es corresponding to the end cord 6E and the minimum height position Pec of the terminal trough 50ef corresponding to the edge of the protrusion rubber 3.

And the distance Xm corresponding to the protrusion length of the protrusion rubber 3 is computed from the maximum height position Pea of the end crest 50*es* and the minimum height position Pec of the terminal trough 50*ef*. Therefore, the protrusion length of the protrusion rubber 3 can surely be found.

Also, the sensor units 30*a*, 30*b* and the cutter units 20*a*, 20*b* are installed along the conveyance route of the rubber sheet 1. Hence the protrusion length of the protrusion rubber 3 can be measured in an in-line manner during the conveyance of the rubber sheet 1.

Also, the sensor units 30*a*, 30*b* image the rubber sheet 1 intermittently at predetermined time intervals. Accordingly, it is possible to prevent the occurrence of quality defect in the protrusion rubbers 3 having been formed upstream and, even if any quality defect has occurred, a defective sheet will not flow to the subsequent process. Also, the control unit 40 can ensure the traceability of the rubber sheet 1 by storing the waveforms 50*a*, 50*b* imaged by the sensor units 30*a*, 30*b* on a hard disk or the like.

DESCRIPTION OF REFERENCE NUMERALS 1 rubber sheet
3 protrusion rubber
5 cord array
6E end cord
7 rubber material
10 sheet forming apparatus
11 calender
12-15 calender roll
20*a*, 20*b* cutter unit
23 cutter
24 piston
30*a*, 30*b* sensor unit
31 drive motor
32 shaft
34 sensor
40 control unit
41 monitor

The invention claimed is:

1. A method for measuring a protrusion length of a protrusion portion formed at least on one width end side of a long sheet having a plurality of parallelly arranged cords embedded therein, the method comprising:
generating waveform data by imaging a cross-sectional profile in a width direction of the sheet including the protrusion portion by an imaging means;
detecting maximum height positions of crests and minimum height positions of troughs of the waveform data;
setting, based on the waveform data, a maximum height position of a crest closest to a width end of the sheet as a maximum height position of an end crest;
setting a position corresponding to an edge of the protrusion portion of the sheet, which is located on more width end side than the maximum height position of the end crest, as a minimum height position of a terminal trough;
detecting a distance in a width direction of the sheet between the maximum height position of the end crest and the minimum height position of the terminal trough; and
measuring the protrusion length of the protrusion portion based on the detected distance.

2. The method for measuring a protrusion length of a protrusion portion according to claim 1, wherein the maximum height position of the end crest is identified as such when a distance in a height direction between the maximum height position of the end crest and the minimum height position of the terminal trough is greater than a distance in the height direction between a maximum height position of a crest and a minimum height position of a trough, the crest and the trough being located on more center side of the sheet than the maximum height position of the end crest.

3. The method for measuring a protrusion length of a protrusion portion according to claim 1, wherein the maximum height position of the end crest is identified as such when a distance in a height direction between the maximum height position of the end crest and the minimum height position of the terminal trough is greater than a predetermined value.

4. The method for measuring a protrusion length of a protrusion portion according to claim 1, wherein the maximum height position of the end crest is detected as such when a counted number of crests from a center side of the sheet toward the edge thereof has reached a predetermined value.

5. The method for measuring a protrusion length of a protrusion portion according to claim 1, wherein the maximum height position of the end crest is detected as such when the maximum height position of the end crest is at a predetermined distance in the width direction of the sheet from an optional position on a center side of the sheet.

6. The method for measuring a protrusion length of a protrusion portion according to claim 1, wherein the maximum height position of the end crest is identified as such when a height of the end crest from a predefined level is determined to be greatest.

7. An apparatus for measuring a protrusion length of a protrusion portion formed at least on one width end of a long sheet having a plurality of parallelly arranged cords embedded therein, the apparatus comprising:
an imaging means that images a cross-sectional profile in a width direction of a surface of the sheet including the protrusion portion; and
a control means that detects, from waveform data of the imaged cross-sectional profile of the sheet, a maximum height position of an end crest corresponding to a maximum height position of a crest located at a width end and a minimum height position of a terminal trough corresponding to an edge of the protrusion portion of the sheet, which is located on more width end side than the maximum height position of the end crest.

8. The apparatus for measuring a protrusion length of a protrusion portion according to claim 7, further comprising a cutting means that cuts the protrusion portion according to the protrusion length of the protrusion portion.

* * * * *